US010302812B2

(12) United States Patent
Wang et al.

(10) Patent No.: US 10,302,812 B2
(45) Date of Patent: May 28, 2019

(54) SYSTEMS AND METHODS FOR CHARACTERIZING A SPATIAL FREQUENCY OF INTERFACE REGIONS WITHIN A SUBTERRANEAN FORMATION

(71) Applicants: Lei Wang, The Woodlands, TX (US); Richard E. Beckham, Pearland, TX (US); Scott R. Buechler, Spring, TX (US)

(72) Inventors: Lei Wang, The Woodlands, TX (US); Richard E. Beckham, Pearland, TX (US); Scott R. Buechler, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 951 days.

(21) Appl. No.: 14/830,777

(22) Filed: Aug. 20, 2015

(65) Prior Publication Data
US 2016/0146003 A1    May 26, 2016

Related U.S. Application Data

(60) Provisional application No. 62/084,001, filed on Nov. 25, 2014.

(51) Int. Cl.
*G01V 11/00* (2006.01)
*E21B 44/00* (2006.01)

(52) U.S. Cl.
CPC ............ *G01V 11/002* (2013.01); *E21B 44/00* (2013.01)

(58) Field of Classification Search
CPC .............................. E21B 44/00; G01V 11/002
See application file for complete search history.

(56) References Cited

U.S. PATENT DOCUMENTS

| 4,837,517 A | * | 6/1989 | Barber | .................. G01V 3/28 |
| | | | | 324/339 |
| 2011/0174541 A1 | * | 7/2011 | Strachan | ................ E21B 44/00 |
| | | | | 175/27 |

OTHER PUBLICATIONS

Bassiouni, Z., "Chapter 15, Log Interpretation of Shaly Formations," SPE Textbook Series, vol. 4: Theory, Measurement, and Interpretation of Well Logs, Society of Petroleum Engineers Textbook Series, 1994, vol. 4., pp. 312-328.

(Continued)

*Primary Examiner* — Alexander Satanovsky
(74) *Attorney, Agent, or Firm* — ExxonMobil Upstream Research Company—Law Department

(57) ABSTRACT

Systems and methods for characterizing a spatial frequency of interface regions within a subterranean formation. A first method may include drilling a wellbore with a drilling assembly and measuring a downhole parameter during the drilling. The downhole parameter may be indicative of a lithology of a portion of the subterranean formation that is proximal to the drilling assembly. The first method also may include calculating an information entropy of the downhole parameter and characterizing the spatial frequency of the interface regions based upon the information entropy. A second method may include calculating the information entropy as a function of distance within a first wellbore and characterizing the spatial frequency of the interface regions. The second method also may include drilling a second wellbore within the subterranean formation and regulating the drilling based upon the spatial frequency of the interface regions. The systems include systems that perform the methods.

25 Claims, 4 Drawing Sheets

(56) References Cited

OTHER PUBLICATIONS

Janwadkar et al., "*Advanced LWD and Directional Drilling Technologies Overcome Drilling and Completion Challenges in Lateral Wells of Barnett Shale*," Society of Petroleum Engineers, Nov. 11-14, 2007, SPE 110837, pp. 1-18.
Kamel et al., "*Estimation of shale volume using a combination of the three porosity logs*," Journal of Petroleum Science & Engineering, vol. 40 (2003), pp. 145-157.
Kukal et al., "*Log Analysis of Clay Volume: An Evaluation of Techniques and Assumptions Used in an Upper Cretaceous Sand-Shale Sequence*," SPWLA Twenty-Seventh Annual Logging Symposium, Jun. 9-13, 1986, pp. 1-22.
Minh et al., "*Formation Evaluation in Thin Sand/Shale Laminations*," Society of Petroleum Engineers, Nov. 11-14, 2007, SPE 109848, pp. 1-8.
Shannon, C. E., "*A Mathematical Theory of Communication*," The Bell System Technical Journal, vol. 27, Jul., Oct. 1948, pp. 379-423, 623-656.

\* cited by examiner

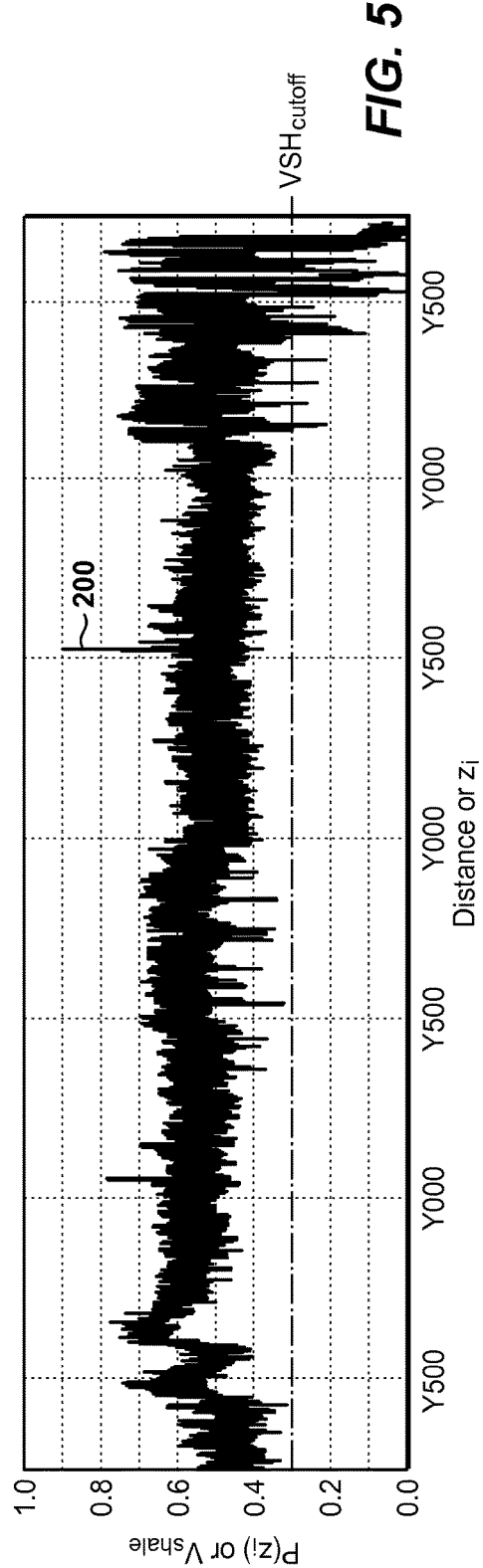
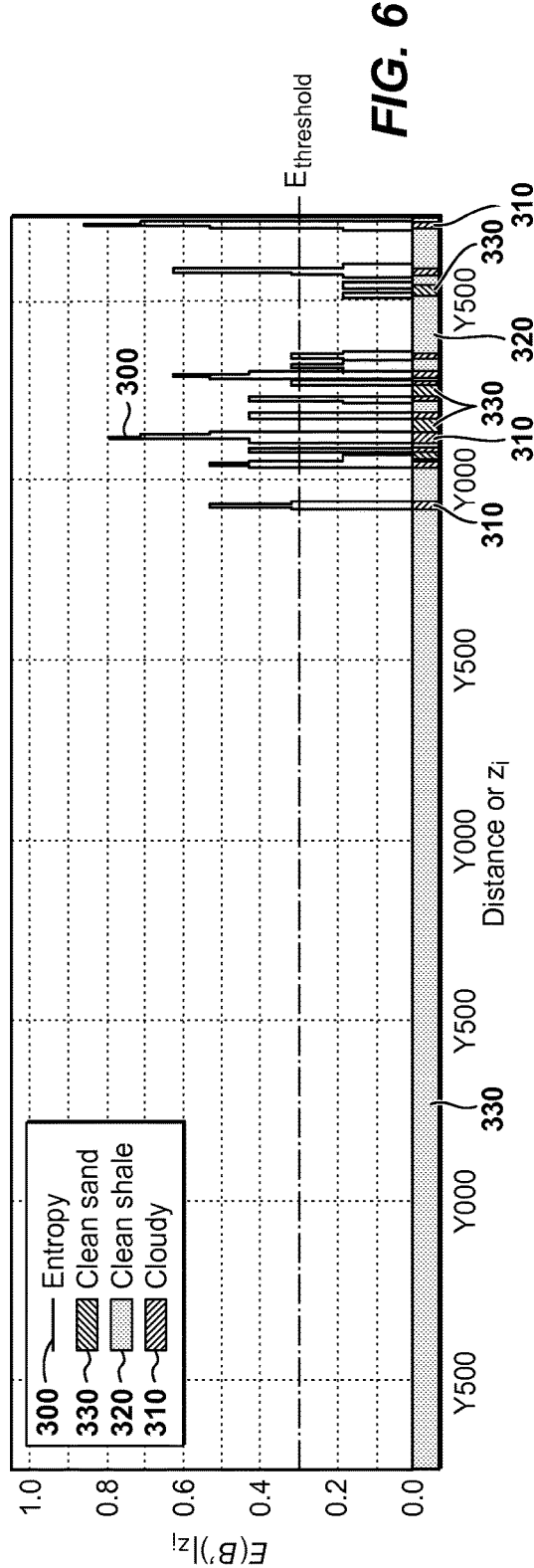

SYSTEMS AND METHODS FOR CHARACTERIZING A SPATIAL FREQUENCY OF INTERFACE REGIONS WITHIN A SUBTERRANEAN FORMATION

CROSS-REFERENCE TO RELATED APPLICATION

This application claims the benefit of U.S. Provisional Patent Application 62/084,001, filed Nov. 25, 2014, entitled "Systems And Methods For Characterizing A Spatial Frequency Of Interface Regions Within A Subterranean Formation," the entirety of which is incorporated by reference herein.

FIELD OF THE DISCLOSURE

The present disclosure relates generally to systems and methods for characterizing a spatial frequency of interface regions within a subterranean formation and more particularly to systems and methods that utilize information entropy to characterize the spatial frequency of the interface regions.

BACKGROUND OF THE DISCLOSURE

Drilling a wellbore within a subterranean formation generally involves drilling through different regions, or strata, of the subterranean formation that may vary in structure and/or composition. As such, interactions between a drilling assembly and the wellbore may vary with the stratum that is being drilled. In addition, different strata of the subterranean formation may respond differently to the drilling process.

As an example, certain (relatively harder) strata of the subterranean formation may have a higher strength and/or may resist the drilling process more than other (relatively softer) strata of the subterranean formation. As another example, a drilling process that may be effective at drilling a first stratum of the subterranean formation may be ineffective or less effective at drilling a second stratum of the subterranean formation and/or may damage the second stratum of the subterranean formation.

As yet another example, interface regions between two different strata of the subterranean formation may present distinct challenges to the drilling process. As an example, the drilling assembly may stick within the interface region. In extreme situations, this sticking may lead to loss of the drilling assembly within the wellbore and/or may require expensive and/or time-consuming mitigation processes to release the stuck drilling assembly from the wellbore. As another example, one or more of the strata may fracture if the drilling process is not carefully regulated within the interface region. This fracturing may permit drilling fluid to flow away from the wellbore, leading to lost returns, a potential loss of hydrostatic pressure, which may result in well control related issues, and/or further damage to the subterranean formation.

In subterranean formations that include few interface regions, the drilling process may be optimized for drilling in each strata, and the potential for loss of the drilling assembly and/or fracture of strata may be relatively low. However, in subterranean formations that include a high number of interface regions, that include rapid changes between differing strata, and/or that include a high spatial frequency of interface regions, the potential for loss of the drilling assembly and/or fracture of the strata may increase substantially. Such subterranean formations may be referred to herein as "cloudy" formations.

When drilling a wellbore within cloudy formations and/or within cloudy portion(s) of a subterranean formation, it may be desirable to modify one or more parameters of the drilling process. Additionally or alternatively, it also may be desirable to predict the presence and/or location of cloudy formations and/or of cloudy portion(s) of the given subterranean formation. Thus there exists a need for improved systems and methods for characterizing a spatial frequency of interface regions within a subterranean formation.

SUMMARY OF THE DISCLOSURE

Systems and methods for characterizing a spatial frequency of interface regions within a subterranean formation. A first method may include drilling a wellbore with a drilling assembly and measuring a downhole parameter during the drilling. The downhole parameter may be indicative of a lithology of a portion of the subterranean formation that is proximal to the drilling assembly, and the measuring may include measuring to generate a database of the downhole parameter as a function of distance along the wellbore. The first method also may include calculating an information entropy of the downhole parameter as a function of distance along the wellbore and characterizing the spatial frequency of the interface regions as a function of distance along the wellbore. The characterizing may be based upon the calculated information entropy of the downhole parameter.

A second method may include calculating an information entropy of a downhole parameter as a function of distance along a first wellbore. The first wellbore may extend within a subterranean formation, and the calculating may include calculating for, or from, a database of the downhole parameter as a function of distance along the first wellbore. The second method further may include characterizing a spatial frequency of the interface regions as a function of distance along the first wellbore. The characterizing may be based upon the calculated information entropy of the downhole parameter. The second method also may include drilling a second wellbore within the subterranean formation with a drilling assembly and regulating the drilling based upon the spatial frequency of the interface regions within the subterranean formation.

The systems include systems that perform at least a portion of at least one of the methods. The systems include a wellbore, a drilling assembly and an analysis system. The analysis system is programmed to perform at least the calculating and the characterizing steps of the method(s).

BRIEF DESCRIPTION OF THE DRAWINGS

FIG. 5 is a schematic plot of Vshale as a function of distance along a wellbore.

FIG. 6 is a schematic plot of information entropy as a function of distance along the wellbore of FIG. 5.

DETAILED DESCRIPTION AND BEST MODE OF THE DISCLOSURE

FIGS. 1-6 provide examples of hydrocarbon wells 20 according to the present disclosure, of methods 100 according to the present disclosure, of Vshale 200 plots that may be generated and/or utilized with the systems and methods according to the present disclosure, and/or of information entropy 300 plots that may be calculated with the systems and methods according to the present disclosure. In general, elements that are likely to be included are illustrated in solid lines, while elements that are optional are illustrated in dashed lines. However, elements that are shown in solid lines may not be essential. Thus, an element shown in solid lines may be omitted without departing from the scope of the present disclosure.

Figure 1:
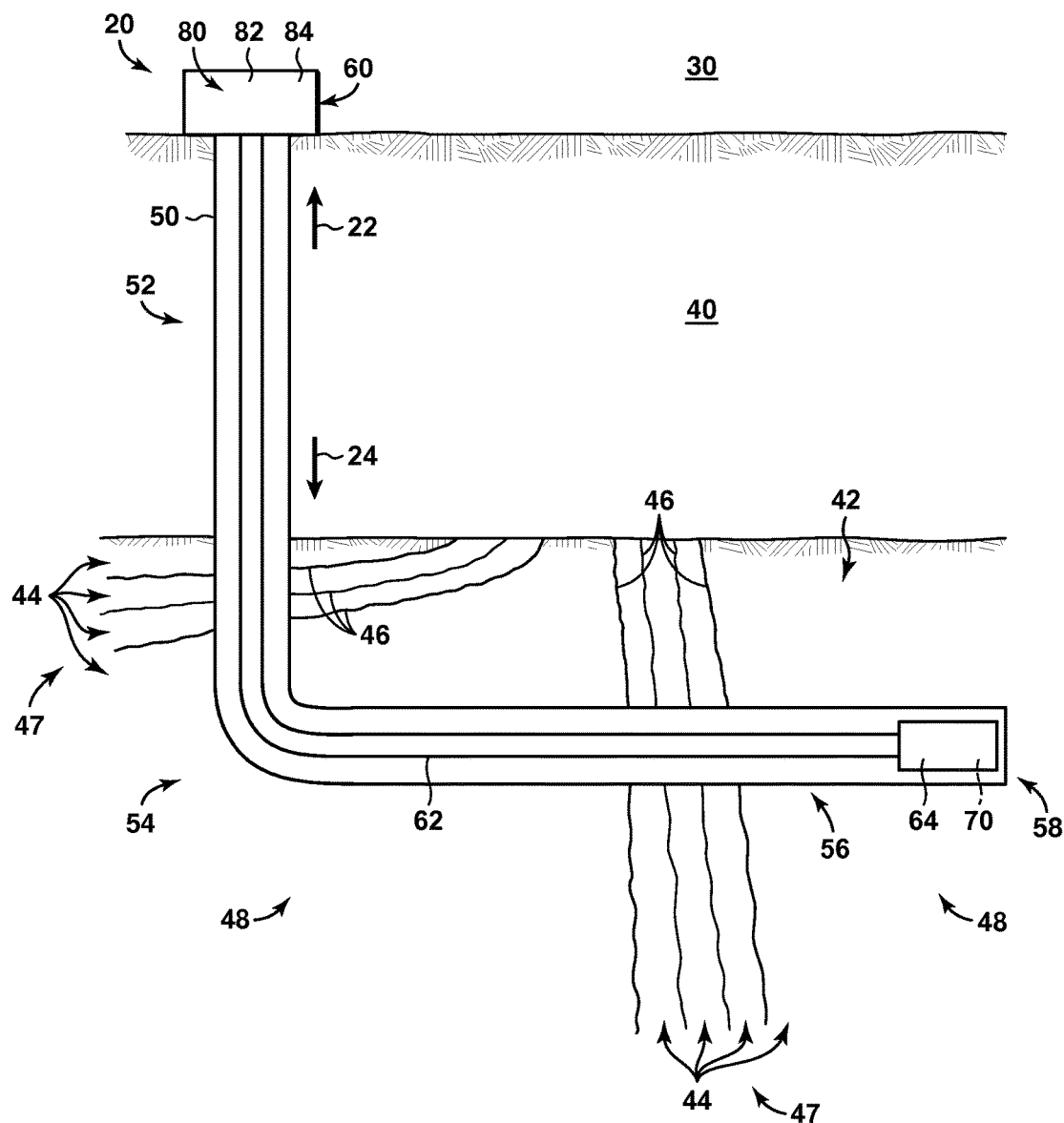
FIG. 1 is a schematic representation of examples of a hydrocarbon well according to the present disclosure.

FIG. 1 is a schematic representation of examples of a hydrocarbon well 20 according to the present disclosure. Hydrocarbon well 20 includes a wellbore 50 that extends within a subterranean formation 42 that is present within a subsurface region 40. Additionally or alternatively, wellbore 50 may extend between a surface region 30 and subterranean formation 42. Hydrocarbon well 20 also includes a drilling assembly 64 that is present within the wellbore. Drilling assembly 64 also may be referred to herein as an assembly 64 and is configured to drill the wellbore and/or to increase a length of the wellbore.

Hydrocarbon well 20 further includes an analysis system 80. Analysis system 80 includes a memory storage device 82 that includes (or has stored therein) a database 84 of a downhole parameter as a function of distance along wellbore 50. Analysis system 80 is adapted, configured, designed, constructed, and/or programmed to perform any suitable portion of methods 100, which are discussed in more detail herein. This may include performing at least the calculating at 140 and the characterizing at 150 of methods 100.

Subterranean formation 42 may include a plurality of strata, 44, and a plurality of interface regions 46 may extend between adjacent strata 44. Strata 44 additionally or alternatively may be referred to as regions 44 and/or zones 44 of the subterranean formation. Interface regions 46 may extend (at least substantially) horizontally, (at least substantially) vertically, and/or at any suitable angle within subterranean formation 42. In addition, wellbore 50 may include a vertical portion 52, a deviated portion 54, and/or a horizontal portion 56. Thus, wellbore 50 may cross, intersect, and/or extend through interface regions 46 at a variety of relative angles, including skew, obtuse, or acute angles and/or may extend (at least substantially) parallel to one or more interface regions 46.

As illustrated in FIG. 1, wellbore 50 may extend through portions of subterranean formation 42 that include few interface regions 46 and/or that include a relatively larger distance between interface regions 46, as well as through portions of subterranean formation 42 that include many interface regions 46 and/or that include a relatively shorter distance between interface regions 46. The portions of subterranean formation 46 that include the relatively shorter distance between interface regions 46 may be referred to herein as having a high spatial frequency of interface regions 46 and/or as being "cloudy." In contrast, portions of subterranean formation 46 that include the relatively larger distance between interface regions 46 may be referred to herein as having a low spatial frequency of interface regions 46 and/or as being "clean" or "clear."

Portions of subterranean formation 42 with a relatively high spatial frequency of interface regions 46 are indicated in FIG. 1 at 47. These portions of subterranean formation 42 also may be referred to herein as cloudy portions 47 and/or as locally heterogeneous portions 47. Portions of subterranean formation 42 with a relatively low spatial frequency of interface regions 46 are indicated at 48. These portions of subterranean formation 42 also may be referred to herein as clean portions 48, as clear portions 48, and/or as locally homogeneous portions 48.

Cloudy portions 47 of subterranean formation 42 are not required to be heterogeneous on every length scale. As an example, each strata 44 may be internally homogeneous (i.e., composed of a substantially single material) or heterogeneous (i.e., composed of several different materials). Instead, the terms "cloudy portions 47" and/or "locally heterogeneous portions 47" may refer to regions of subterranean formation 42 that have less than a threshold spacing, distance, closest spacing, and/or closest distance between interface regions 46, at least in a direction that is parallel to wellbore 50.

Similarly, clean portions 48 of subterranean formation 42 are not required to be homogeneous on every length scale. As an example, each strata 44 may be internally homogeneous or heterogeneous. Instead, the terms "clean portions 48," "clear portions 48," and/or "locally homogeneous portions 48" may refer to regions of subterranean formation 42 that have at least the threshold spacing between interface regions 46, at least in the direction that is parallel to wellbore 50.

The threshold spacing between interface regions 46 may have any suitable value and this value may vary with the composition of subterranean formation 42, with the composition of strata 44, and/or with the drilling process that is utilized to form wellbore 50. As examples, the threshold spacing may be at least 0.1 meters, at least 0.25 meters, at least 0.5 meters, at least 1 meter, at least 2 meters, at least 3 meters, at least 5 meters, or at least 10 meters. Additionally or alternatively, the threshold spacing may be less than 100 meters, less than 75 meters, less than 50 meters, less than 40 meters, less than 30 meters, less than 20 meters, less than 10 meters, less than 5 meters, or less than 1 meter. Threshold distances that are between any one of the above-listed lower values and any one of the above-listed upper values, as well as threshold distances that are substantially equal to any one of the above-listed lower values or any of the above-listed upper values are also within the scope of the present disclosure.

As discussed, drilling assembly 64 may be utilized to form and/or drill wellbore 50. This may include extending a length of wellbore 50 and/or moving drilling assembly 64 away from surface region 30, in a downhole direction 24, and/or opposed to an uphole direction 22. During operation of drilling assembly 64 and/or drilling of wellbore 50, a sensor 70 may be utilized to measure a value of a downhole parameter within a portion of subterranean formation 42 that is proximal to drilling assembly 64. The downhole parameter may be selected to be indicative of a lithology of the portion of the subterranean formation. As an example, the downhole parameter may be selected to indicate a composition of a given region 44 in which drilling assembly 64 is drilling. As another example, the downhole parameter may be selected to indicate the presence of interface regions 46.

Data analysis system 80 may receive information from sensor 70 and may utilize this information to generate database 84. Data analysis system 80 also may perform one or more steps of methods 100 to characterize the spatial frequency of interface regions 46, to classify a given portion of subterranean formation 42 as a cloudy portion 47 or as a clear portion 48, to quantify a location, depth, and/or thickness of a given interface region 46, to quantify a location, depth, and/or thickness of a given cloudy portion 47, and/or to quantify a location, depth, and/or thickness of a given clear portion 48.

As discussed in more detail herein with reference to methods 100, operation of drilling assembly 64 further may include performing one or more actions responsive to determining that the spatial frequency of the interface regions within a given portion of subterranean formation 42 is greater than a threshold interface frequency. This response may include preparing for the possibility of lost returns within the drilling process, adjusting a flow rate of drilling fluid (or mud) to the drilling assembly, modifying a weight that may be applied to the drilling assembly, modifying a rotational speed of a drill bit of the drilling assembly, providing a lost circulation material to the drilling assembly and/or to the drilling fluid, altering a density of the drilling fluid, and/or altering a direction of the drilling process, and is discussed in more detail herein. This altering and/or modifying may include increasing, decreasing, and/or otherwise changing the corresponding value.

Sensor 70 may include any suitable sensor that may detect the downhole parameter. Examples of sensor 70 include a neutron density sensor, a gamma ray sensor, a spontaneous potential sensor, a resistivity sensor, and/or a density sensor.

As a more specific example, interface regions 46 may be interface regions between shale regions 44 and sand regions 44 within subterranean formation 42. Under these conditions, sensor 70 may include and/or be a gamma ray sensor that is configured to detect gamma rays that may be emitted by the subterranean formation during the drilling process, and the downhole parameter may include and/or be gamma ray data. As discussed in more detail herein with reference to methods 100, the gamma ray data may be normalized to produce and/or generate a database of shale volume ($V_{shale}$) as a function of distance along wellbore 50, with a relatively higher $V_{shale}$ value indicating that the drilling assembly is proceeding through clean shale, a relatively lower $V_{shale}$ value indicating that the drilling assembly is proceeding through clean sand, and a relatively noisy, or bimodal, $V_{shale}$ trend indicating that the drilling assembly is proceeding through a large number of interface regions 46 and thus is located within a cloudy portion 47 of the subterranean formation. Methods 100 further may be utilized to determine and/or calculate an information entropy of the database of shale volume as a function of distance, with this information entropy then being utilized to characterize the spatial frequency of interface regions 46 (i.e., the relative cloudiness 47 or clearness 48 of a given region of the subterranean formation).

Drilling assembly 64 may include and/or be any suitable structure that may be utilized to drill and/or form wellbore 50. As an example, drilling assembly 64 may include and/or be a drill bit. Drilling assembly 64 may form a portion of a drill string 62 that may extend within wellbore 50 and/or that may extend from surface region 30 to a terminal end 58 of wellbore 50. Drill string 62 and/or drilling assembly 64 may form a portion of a drill rig 60.

Figure 2:
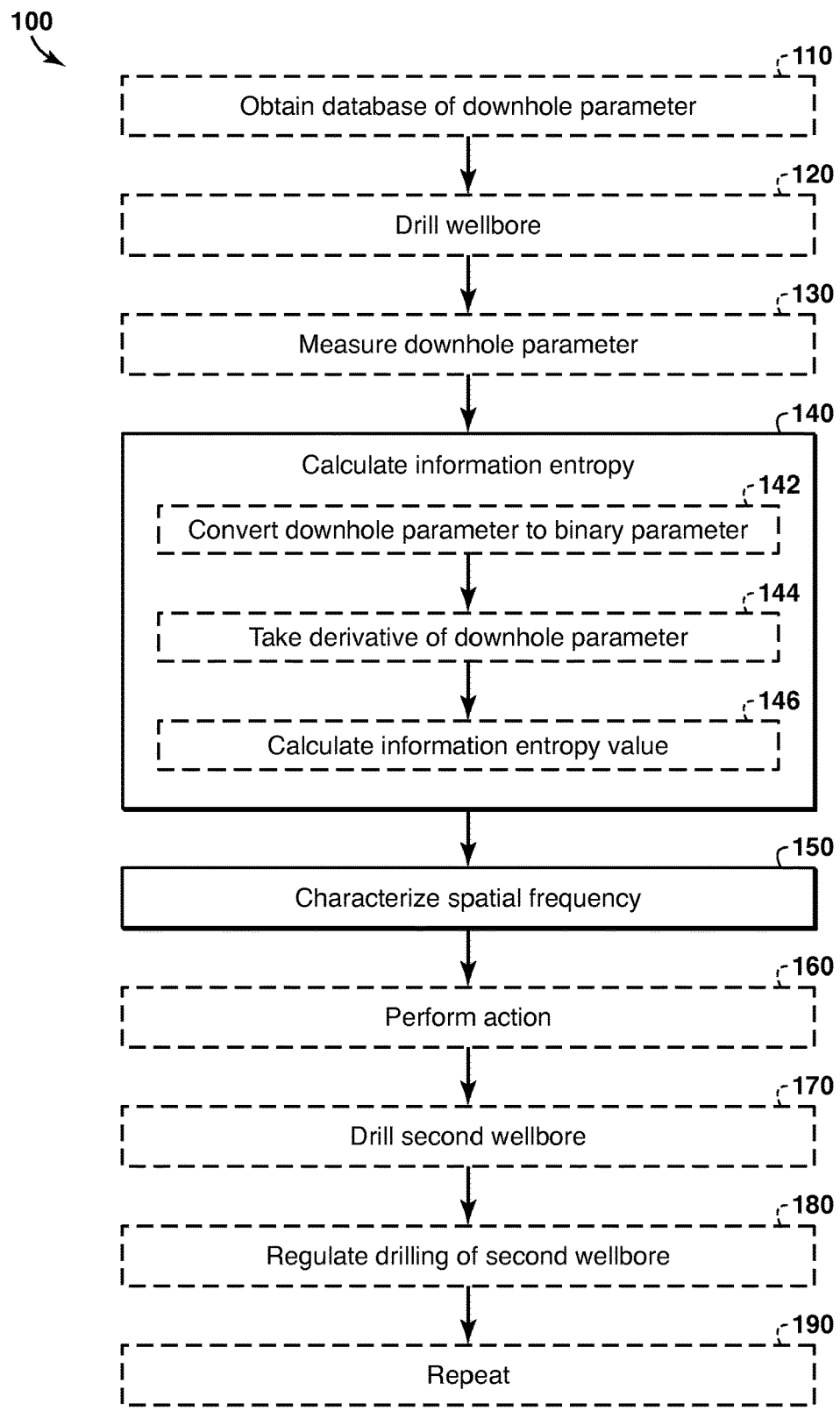
FIG. 2 is a flowchart depicting methods according to the present disclosure.

FIG. 2 is a flowchart depicting examples of methods 100 according to the present disclosure. Methods 100 may include methods of characterizing a spatial frequency of interface regions within a subterranean formation. Additionally or alternatively, methods 100 also may include methods of drilling a wellbore within the subterranean formation.

Methods 100 may include obtaining a database of a downhole parameter at 110, drilling a wellbore at 120, and/or measuring the downhole parameter at 130. Methods 100 include calculating an information entropy at 140 and characterizing the spatial frequency of the interface regions at 150. Methods 100 further may include performing an action at 160, drilling a second wellbore at 170, regulating the drilling of the second wellbore at 180, and/or repeating at least a portion of the methods at 190.

FIG. 2 illustrates methods 100 that generally include the calculating at 140 and the characterizing at 150 and that optionally may include a plurality of additional steps that may be performed before, during, and/or after the calculating at 140 and the characterizing at 150, that may be utilized to obtain and/or measure the downhole parameter, which may be utilized during the calculating at 140, and/or that may be controlled and/or regulated based upon the characterizing at 150. It is within the scope of the present disclosure that a given method of methods 100 may include any suitable subset of the listed method steps.

As an example, a first method of methods 100 may include drilling a wellbore, such as via the drilling at 120, and measuring the downhole parameter, such as via the measuring at 130, during the drilling at 120. The first method also may include the calculating at 140, with the information entropy being calculated as a function of distance along the wellbore in real-time as the wellbore is being drilled (i.e., during the drilling at 120). The information entropy may be calculated based upon (or may be the information entropy of) the downhole parameter that is measured during the measuring at 130. The first method further may include the characterizing at 150, with the spatial frequency of the interface regions being characterized based upon the information entropy that was calculated during the calculating at 140. In such a first method, the spatial frequency of the interface regions within the subterranean formation may be determined in real-time as the wellbore is being drilled (i.e., during the drilling at 120). This may permit regulation and/or control of the drilling at 120 in real-time (such as via the performing at 160 and/or the repeating at 190).

As another example, a second method of methods 100 may include calculating the information entropy of the downhole parameter as a function of distance along a first wellbore that extends within the subterranean formation, such as via the calculating at 140. The second method also may include characterizing the spatial frequency of the interface regions within the subterranean formation, such as via the characterizing at 150. The second method then may include drilling a second wellbore within the subterranean formation with a drilling assembly, such as via the drilling at 170, and regulating, such as via the regulating at 180, the drilling at 170 based upon the spatial frequency of the interface regions. Thus, the second method may permit (real-time) control of the drilling of the second wellbore based upon information from (or obtained during drilling of) the first wellbore.

Obtaining the database of the downhole parameter at 110 may include obtaining any suitable database of any suitable downhole parameter as a function of distance along the, or along a first, wellbore. The downhole parameter may be indicative of a structure, morphology, composition, and/or lithology of the subterranean formation, and the database may include values of the downhole parameter at a plurality of locations along the wellbore and/or at a plurality of distances from a reference location along the wellbore, such as an intersection of the wellbore with the surface region. As an example, the database of the downhole parameter may include a plurality of values of the downhole parameter and a corresponding plurality of distances along the wellbore at which the values of the downhole parameter were obtained. Under these conditions, each of the values of the downhole parameter may be and/or may have been determined, calculated, and/or estimated at a corresponding distance along the wellbore.

The obtaining at 110 may be accomplished and/or performed in any suitable manner. As an example, the obtaining at 110 may include performing the drilling at 120 and the measuring at 130, which are discussed in more detail herein, to concurrently form the wellbore (or the first wellbore) and measure the downhole parameter. As another example, the obtaining at 110 also may include obtaining the database of the downhole parameter, or any suitable fraction and/or portion thereof, from previously collected geological and/or lithological analysis of the subterranean formation.

The distance along the wellbore (or along the first wellbore) may include and/or be any suitable distance. As examples, the distance along the wellbore may include a location along the wellbore, a Measured Depth (MD) within the wellbore (i.e., a distance along the wellbore between a given point and the surface region), and/or a True Vertical Depth (TVD) within the wellbore.

Drilling the wellbore at 120 may include drilling the wellbore (or the first wellbore) in any suitable manner. As an example, the drilling at 120 may include drilling the wellbore within and/or through the subterranean formation with a drilling assembly. The drilling at 120 may be performed at any suitable time and/or with any suitable sequence within methods 100. As an example, the drilling at 120 may be performed prior to the calculating at 140 and/or prior to the characterizing at 150. As another example, the drilling at 120 may be at least partially concurrent with the calculating at 140 and/or with the characterizing at 150.

When methods 100 include the drilling at 120, the methods further may include continuing the drilling subsequent to performing the characterizing at 150. Under these conditions, the continuing may be based upon and/or controlled responsive to the characterizing at 150. As an example, and as discussed in more detail herein, the drilling at 120 may be modified, changed, and/or adjusted based upon the characterizing at 150. Additionally or alternatively, methods 100 also may include repeating the drilling based, at least in part, on the characterizing at 150. This may include repeating the drilling within another (or a second) wellbore that is spaced apart from the (or the first) wellbore and/or may include performing the drilling at 170, which is discussed in more detail herein.

Measuring the downhole parameter at 130 may include measuring the downhole parameter during, concurrently with, or at least partially concurrently with the drilling at 120. The downhole parameter may be indicative of a lithology of a portion of the subterranean formation that is proximal to and/or in contact with the drilling assembly. The measuring at 130 may include measuring to generate the database of the downhole parameter.

The measuring at 130 may be performed at any suitable time and/or with any suitable sequence during methods 100. As an example, the measuring at 130 may be performed prior to the calculating at 140 and/or prior to the characterizing at 150. As another example, the measuring at 130 may be performed at least partially, or even completely, concurrent with the calculating at 140 and/or with the characterizing at 150.

Calculating the information entropy at 140 may include calculating the information entropy in any suitable manner and/or utilizing any suitable process. The information entropy may include and/or be the information entropy of the downhole parameter as a function of distance along the wellbore (or along the first wellbore) and/or may be a measure of variability in the downhole parameter. The calculating at 140 may include calculating for, from, and/or based upon the database of the downhole parameter.

When methods 100 include the drilling at 120 and the measuring at 130, the calculating at 140 may be performed in real-time and/or concurrently with the drilling at 120 and/or with the measuring at 130. Under these conditions, the calculating at 140 may provide real-time, or quasi-real-time, information regarding the wellbore that is being drilled during the drilling at 120.

When methods 100 also include the drilling at 170, the drilling at 120 may include drilling the first wellbore, and the drilling at 170 may include drilling the second wellbore. Under these conditions, the calculating at 140 may include calculating the information entropy of a database, or data set, of the downhole parameter as a function of distance along the first wellbore, and this information entropy may be utilized to control, direct, and/or regulate drilling of the second wellbore (at 170). Additionally or alternatively, and when methods 100 include the drilling at 170, the database of the downhole parameter as the function of distance along the first wellbore may be obtained in any suitable manner, such as via the obtaining at 110, and is not required to include performing the drilling at 120 and/or the measuring at 130.

The calculating at 140 may include converting the downhole parameter to a binary parameter, as indicated in FIG. 2 at 142. The converting at 142 may include assigning a first binary value to the binary parameter responsive to the corresponding downhole parameter being less than a threshold parameter value. The converting at 142 alternatively may include assigning a second binary value to the binary parameter responsive to the corresponding downhole parameter being greater than the threshold downhole parameter value. The second binary value may be different from the first binary value. Additionally or alternatively, the first binary value may be less than the second binary value. As an example, the first binary value may be 0, and the second binary value may be 1.

As a more specific example, the downhole parameter may be $P(z_i)$, where $z_i$ is the distance along the wellbore for the given value of the downhole parameter. In addition, the converting at 142 may include calculating $B(z_i)$, where $B(z_i)$ is the binary parameter. When $P(z_i)$ is greater than or equal to the threshold parameter value, $B(z_i)$ may be set equal to 1 ($B(z_i)=1$). When $P(z_i)$ is less than the threshold downhole parameter value, $B(z_i)$ may be set equal to 0 ($B(z_i)=0$).

As discussed, the downhole parameter may include and/or be a shale volume, Vshale. Under these conditions, the threshold downhole parameter value may be a volume of shale cutoff, VSHcutoff, for the shale volume. Thus, $B(z_i)$ may be set equal to 1 ($B(z_i)=1$) for $P(z_i)$>VSHcutoff. This may indicate that the drilling assembly is proximal to, located within, and/or drilling through shale. Alternatively, $B(z_i)$ may be set equal to 0 ($B(z_i)=0$) for $P(z_i)$<VSHcutoff. This may indicate that the drilling assembly is proximal to, located within, and/or drilling through sand.

Figure 3:
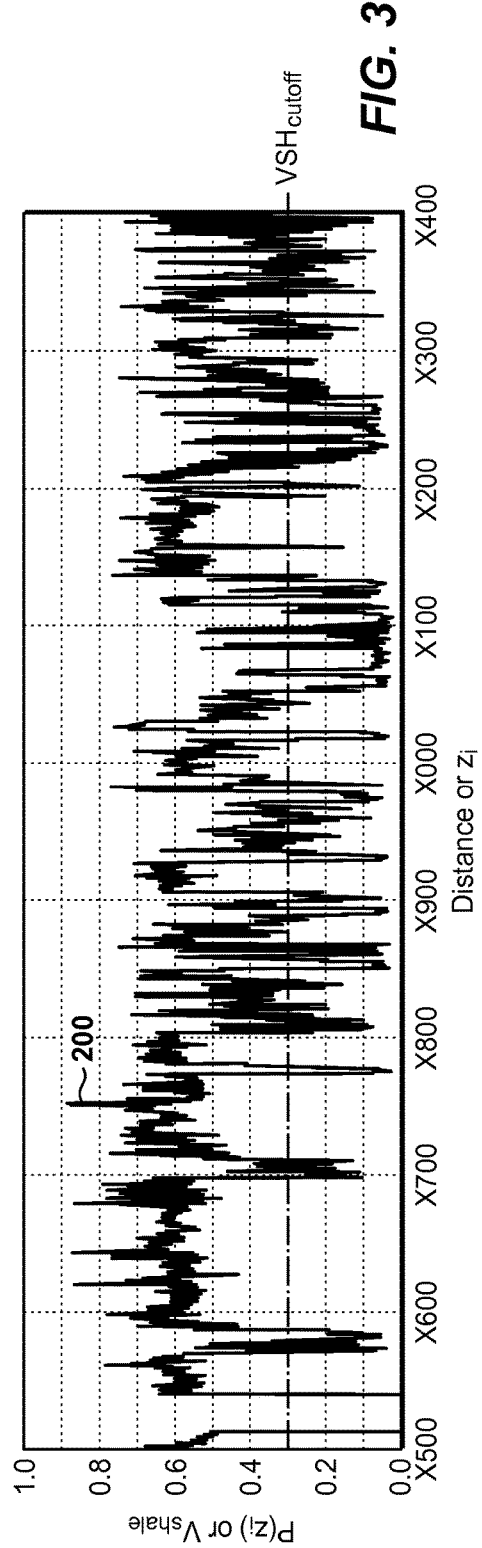
FIG. 3 is a schematic plot of Vshale as a function of distance along a wellbore.

By way of illustration, FIGS. 3 and 5 are schematic plots of a downhole parameter (i.e., Vshale 200) as a function of distance along a wellbore (i.e., $z_i$). With reference to FIG. 3, the Vshale plot has a baseline noise level but generally transitions in a stepwise fashion between relatively higher values and relatively lower values. For a given distance, a relatively higher Vshale value indicates that the subterranean formation is (predominantly) shale, while a relatively lower Vshale value indicates that the subterranean formation is (predominantly) sand. Rapid transitions between the relatively higher Vshale values and the relatively lower Vshale values qualitatively indicate a region with a large number of sand-shale interfaces. With reference to FIG. 5, the Vshale plot remains relatively higher and stable for a significant portion of a length of the wellbore, only becoming more noisy and/or transitioning to relatively lower values toward a terminal end of the wellbore (i.e., toward the right side of FIG. 5). This qualitatively indicates that the wellbore of FIG. 5 initially extends through clean shale before entering a region with a high spatial frequency of sand-shale interface regions.

With reference to the Vshale plots of FIGS. 3 and 5, a VSHcutoff value of 0.3 may be applied. Under these conditions, a Vshale value of greater than or equal to 0.3 will produce a corresponding B(zi) value of 1, while a Vshale value of less than 0.3 will produce a corresponding B(zi) value of 0.

FIGS. 3 and 5 illustrate a VSHcutoff value of 0.3. However, it is within the scope of the present disclosure that VSHcutoff may have any suitable value that may be selected and/or defined in any suitable manner. As an example, VSHcutoff may be predetermined (such as prior to performing methods 100) based upon geological analysis of the subterranean formation. Examples of VSHcutoff include VSHcutoff values of at least 0.1, at least 0.15, at least 0.2, at least 0.25, at least 0.3, at least 0.35, at least 0.4, at least 0.45, or at least 0.5. Additional examples of VSHcutoff include VSHcutoff values of less than 0.8, less than 0.75, less than 0.7, less than 0.65, less than 0.6, less than 0.55, less than 0.5, less than 0.45, or less than 0.4. VSHcutoff values that are between or (substantially) equal to any of the above-listed upper and lower limits are also within the scope of the present disclosure.

When the downhole parameter includes and/or is Vshale, methods 100 further may include calculating Vshale from a raw downhole parameter. As an example, the raw downhole parameter may include a gamma ray measurement, and calculating Vshale may include normalizing the gamma ray measurement. Additional examples of the raw downhole parameter include a neutron density measurement, a difference between the neutron density measurement and the gamma ray measurement, a spontaneous potential measurement, a resistivity measurement, and/or a density measurement.

The calculating at 140 further may include taking a derivative of the binary parameter, as indicated in FIG. 2 at 144. The derivative may include and/or be a derivative with respect to distance along the wellbore, and the taking the derivative of the binary parameter at 144 may include taking the derivative to calculate, generate, and/or produce a distance-derivative of the binary parameter.

The taking the derivative at 144 may include assigning a first derivative value to the distance-derivative of the binary parameter responsive to the corresponding binary parameter decreasing from a prior binary parameter to a given binary parameter. Alternatively, the taking the derivative at 144 may include assigning a second derivative value to the distance-derivative of the binary parameter responsive to the corresponding binary parameter being unchanged from the prior binary parameter to the given binary parameter. Alternatively, the taking the derivative at 144 may include assigning a third derivative value to the distance-derivative of the binary parameter responsive to the corresponding binary parameter increasing from the prior binary parameter to the given binary parameter.

The second derivative value may be different from the first derivative value. In addition, the third derivative value may be different from both the second derivative value and the first derivative value. As an example, the first derivative value may be less than the second derivative value, and the second derivative value may be less than the third derivative value. As a more specific example, the first derivative value may be −1, the second derivative value may be 0, and the third derivative value may be 1.

As another more specific example, the taking the derivative at 144 may include calculating B'(zi), wherein B'(zi) is the distance-derivative of the binary parameter. Under these conditions, the taking the derivative at 144 may include setting B'(zi) equal to −1 (B'(zi)=−1) for B(zi)<B(zi−1), setting B'(zi) equal to zero (B'(zi)=0) for B(zi)=B(zi−1), or setting B'(zi) equal to 1 (B'(zi)=1) for B(zi)>B(zi−1). For such a configuration, B'(zi)=−1 corresponds to a transition from shale to sand between zi−1 and zi, B'(zi)=1 corresponds to a transition from sand to shale between zi−1 and zi, and B'(zi)=0 corresponds to no change in the composition of the subterranean formation between zi−1 and zi.

The calculating at 140 also may include calculating a probability of a nonzero B'(zi) within a moving window, as indicated at 146. The moving window additionally or alternatively may be referred to as a moving interval, a downhole region, a deformed downhole distance, a wellbore interval, and/or a downhole interval. The calculating at 146 may include calculating a moving average of an absolute value of B'(zi) within the moving window. The moving window may have a predetermined window length. The predetermined window length may be based, at least in part, on prior analysis of the subterranean formation and/or on prior geological survey of the subterranean formation. As a more specific example, the probability of a nonzero B'(zi) within the moving window may be $p(B')|_{z_i}$, and the calculating at 146 may include calculating:

$$p(B')|_{z_i} = \frac{1}{M}\sum_{i=1}^{M} |B'(z_i)|$$

where M is a number of distances $z_i$ included in the moving window (i.e., the predetermined window length).

When methods 100 include the calculating at 146, the information entropy at distance $z_i$, may be $E(B')|_{z_i}$ and the calculating at 140 may include calculating:

$$E(B')|_{z_i} = -p(B')_{z_i} \log(p(B')|_{z_i})$$

Figure 4:
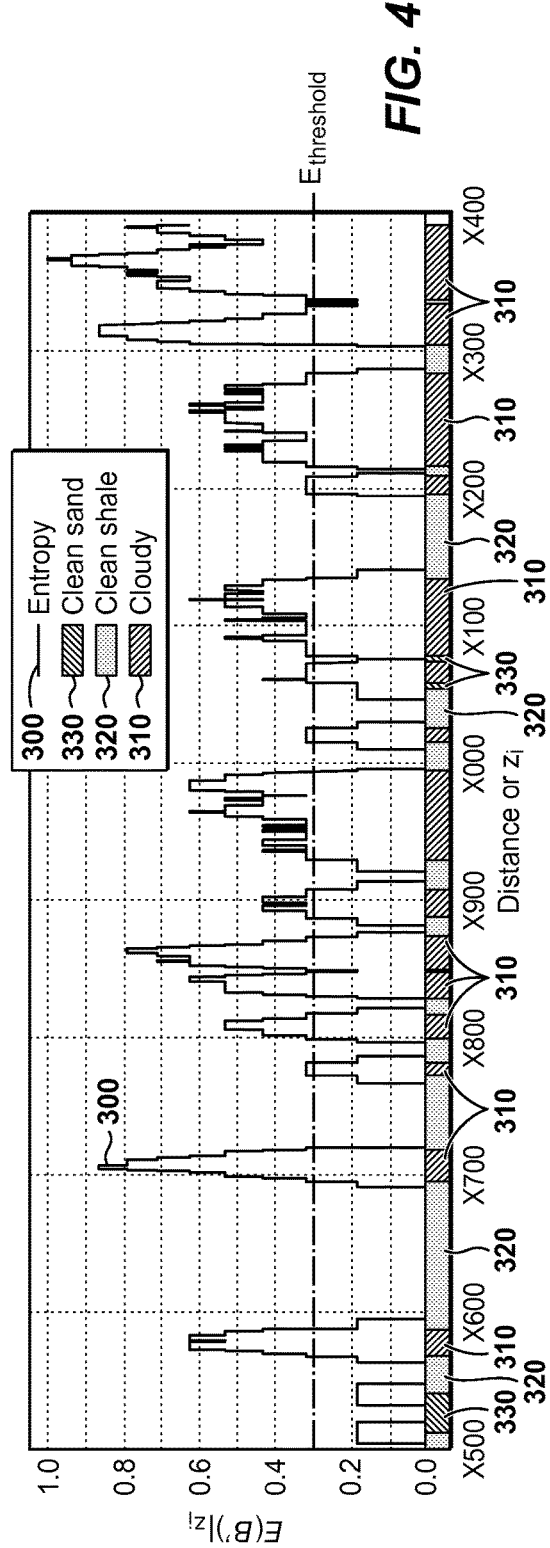
FIG. 4 is a schematic plot of information entropy as a function of distance along the wellbore of FIG. 3.

By way of illustration, FIGS. 4 and 6 plot information entropy 300 (i.e., $E(B')|_{z_i}$) as a function of location (i.e., zi) along the wellbores of FIGS. 3 and 5, respectively. FIG. 4 illustrates that the information entropy of the Vshale data of FIG. 3 is highest (i.e., approaches 1) in portions of the subterranean formation (i.e., distances zi) that have the highest variability and/or the most transitions between values that are below VSHcuttoff and values that are above VSHcutoff. FIG. 4 also illustrates that the information entropy is lowest (i.e., approaches 0) in portions of the subterranean formation (i.e., distances zi) that have the lowest variability and/or the fewest transitions between values that are below VSHcuttoff and values that are above VSHcutoff. A similar trend is illustrated in FIG. 6, with the information entropy remaining near-zero for a majority of the distances zi but increasing with increased variation in the Vshale data (i.e., the right side of FIG. 6).

Characterizing the spatial frequency of the interface regions at 150 may include characterizing the spatial frequency of the interface regions within the subterranean formation as a function of distance along the wellbore (or the first wellbore). The characterizing may be based, at least in part, on the calculated information entropy of the downhole parameter. The characterizing at 150 may be at least partially, or even completely, concurrent with the drilling at 120 and/or with the measuring at 130, such as when the characterizing at 150 is utilized to characterize in real-time. Additionally or alternatively, the characterizing at 150 also may be subsequent to the obtaining at 110, the drilling at 120, and/or the measuring at 130, such as when the characterizing at 150 is utilized to characterize the first wellbore and subsequently to regulate (at 180) drilling of the second wellbore during the drilling at 170.

The characterizing at 150 may include characterizing the spatial frequency of the interface region in any suitable manner. As an example, the characterizing at 150 may include characterizing a given region within the subterranean formation as "cloudy" responsive to the information entropy being greater than a threshold information entropy value. As another example, the characterizing at 150 alternatively may include characterizing the given region of the subterranean formation as "clean" responsive to the information entropy being less than the threshold information entropy value. As a more specific example, the characterizing at 150 may include characterizing the given region of the subterranean formation as clean shale responsive to the information entropy being less than the threshold information entropy value and Vshale being greater than a threshold Vshale value. As another more specific example, the characterizing at 150 may include characterizing the given region of the subterranean formation as clean sand responsive to the information entropy being less than the threshold information entropy value and Vshale being less than the threshold Vshale value. The threshold Vshale value may include and/or be VSHcutoff, which is discussed herein.

The threshold information entropy value may be referred to herein as Ethreshold and may include and/or be any suitable threshold value. As an example, the threshold information entropy value may be at least 0.1, at least 0.15, at least 0.2, at least 0.25, at least 0.3, at least 0.35, at least 0.4, at least 0.45, or at least 0.5. Additionally or alternatively, Ethreshold may be less than 0.8, less than 0.75, less than 0.7, less than 0.65, less than 0.6, less than 0.55, less than 0.5, less than 0.45, or less than 0.4. Ethreshold values that are (substantially) equal to any of the above-listed upper and lower limits are also within the scope of the present disclosure.

Returning to FIGS. 4 and 6, an Ethreshold value of 0.3 has been applied to the illustrated information entropy vs. distance plots. Based upon the Ethreshold value, together with the corresponding value of Vshale at a given distance zi, the subterranean formation has been characterized as cloudy (as indicated at 310), clean shale (as indicated at 320) or clean sand (as indicated at 330) at the given distance zi, as indicated by the bar at the bottom of the plots. Thus, methods 100 may permit characterization of the subterranean formation and/or may permit quantitative analysis of the spatial frequency of interface regions as a function of distance along the wellbore that extends within the subterranean formation. This may include characterization of the presence, or existence, of clean (320 and/or 330) and/or cloudy (310) regions within the subterranean formation, as well as characterization of a location, length, and/or depth of the clean and/or cloudy regions.

Performing the action at 160 may include performing any suitable action with the drilling assembly and/or within the wellbore. The performing at 160 may be based, at least in part, on the spatial frequency of the interface regions that are proximal to the drilling assembly. The threshold interface frequency may be equal to Ethreshold and/or may be based upon Ethreshold, which is discussed herein.

As an example, the performing at 160 may include notifying an operator of a drilling rig that includes the drilling assembly that the spatial frequency of the interface regions is greater than the threshold interface frequency. As another example, the performing at 160 also may include regulating the drilling at 180 and/or the drilling at 170 based, at least in part, on the characterizing at 150. This may include decreasing a rotational frequency of the drilling assembly responsive to the spatial frequency of the interface regions being greater than the threshold interface frequency or increasing the rotational frequency of the drilling assembly responsive to the spatial frequency of the interface regions being less than the threshold interface frequency. This also may include decreasing a weight on a bit of the drilling assembly responsive to the spatial frequency of the interface regions being greater than the threshold interface frequency or increasing the weight on the bit responsive to the spatial frequency of the interface regions being less than the threshold interface frequency.

As yet another example, the performing at 160 also may include increasing a flow rate of drilling fluid, or drilling mud, to the drilling assembly and may be responsive to the spatial frequency of the interface regions being greater than the threshold interface frequency. As another example, the performing at 160 may include decreasing the flow rate of the drilling fluid to the drilling assembly and may be responsive to the spatial frequency of the interface regions being less than the threshold interface frequency.

As yet another example, the performing at 160 may include providing a lost circulation material to the drilling assembly and/or to the drilling fluid. The lost circulation material may be provided responsive to the spatial frequency of the interface regions being greater than the threshold interface frequency. As another example, the performing at 160 may include altering a density of the drilling fluid that may be utilized during the drilling at 120 and/or during the drilling at 170.

As another example, the performing at 160 may include altering a direction of the drilling at 120 and/or of the drilling at 170. As a more specific example, the drilling at 120 and/or the drilling at 170 may include drilling within a selected, or current, region of the subterranean formation and the altering may include altering such that the drilling proceeds through a different region of the subterranean formation. The different region of the subterranean formation may have, or may be selected to have, a lower spatial frequency of interface regions than the selected region of the subterranean formation.

Drilling the second wellbore at 170 may include drilling the second wellbore with a drilling assembly. When methods 100 include the drilling at 120 and the drilling at 170, the drilling at 120 may include drilling the first wellbore. The second wellbore may be different from and/or spaced apart from the first wellbore. The drilling assembly that is utilized during the drilling at 170 may be the same as or different from the drilling assembly that is utilized during the drilling at 120. When methods 100 include the drilling at 170, the drilling at 170 may be performed subsequent to the obtaining at 110, subsequent to the drilling at 120, subsequent to the measuring at 130, subsequent to the calculating at 140, subsequent to the characterizing at 150, and/or subsequent to the performing at 160.

Regulating the drilling of the second wellbore at 180 may include regulating based, at least in part, on the characterizing at 150 and/or on the spatial frequency of the interface regions within the subterranean formation. The regulating at 180 may include regulating in any suitable manner. As an example, the regulating at 180 may be at least substantially similar to the performing at 160, which is discussed in more detail herein.

The regulating at 180 may be performed at any suitable time and/or with any suitable sequence within methods 100. As an example, the regulating at 180 may be at least partially, or even completely, subsequent to the calculating at 140 and/or to the characterizing at 150. As another example, the regulating at 180 may be at least partially, or even completely, concurrent with the calculating at 140 and/or the characterizing at 150. As yet another example, the regulating at 180 may be at least partially, or even completely, concurrent with the drilling at 170.

Repeating at least the portion of the methods at 190 may include repeating any suitable portion, fraction, and/or step of methods 100 in any suitable order and/or with any suitable frequency. As an example, and when methods 100 include the drilling at 120, the measuring at 130, the calculating at 140, and the characterizing at 150, the repeating at 190 may include repeatedly performing the measuring at 130, the calculating at 140, and the characterizing at 150 during the drilling at 120.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method of drilling a wellbore within a subterranean formation with a drilling assembly, the method comprising:
   during the drilling, measuring a downhole parameter that is indicative of a lithology of a portion of the subterranean formation that is proximal the drilling assembly to generate a database of the downhole parameter as a function of distance along the wellbore;
   calculating an information entropy of the downhole parameter as a function of distance along the wellbore;
   characterizing the spatial frequency of the interface regions within the subterranean formation as a function of distance along the wellbore based, at least in part, on the calculated information entropy of the downhole parameter; and
   regulating the drilling assembly at least in part based on the characterized spatial frequency of the interface regions that are proximal the drilling assembly, wherein the regulating includes at least one of:
   (i) notifying an operator of a drill rig that is performing the drilling that the spatial frequency of the interface regions is greater than a threshold interface frequency;
   (ii) decreasing a rotational frequency of the drilling assembly responsive to the spatial frequency of the interface regions being greater than the threshold interface frequency;
   (iii) increasing the rotational frequency of the drilling assembly responsive to the spatial frequency of the interface regions being less than the threshold interface frequency;
   (iv) increasing a flow rate of a drilling mud to the drilling assembly responsive to the spatial frequency of the interface regions being greater than the threshold interface frequency;
   (v) decreasing the flow rate of the drilling mud to the drilling assembly responsive to the spatial frequency of the interface regions being less than the threshold interface frequency;
   (vi) providing a lost circulation material to a drilling fluid that is utilized during the drilling the second wellbore, wherein the providing the lost circulation material is responsive to the spatial frequency of the interface regions being greater than the threshold interface frequency;
   (vii) decreasing a weight on a bit of the drilling assembly responsive to the spatial frequency of the interface regions being greater than the threshold interface frequency;
   (viii) increasing the weight on the bit of the drilling assembly responsive to the spatial frequency of the interface regions being less than the threshold interface frequency;
   (ix) altering a density of the drilling fluid;
   (x) altering an orientation of a drill bit on the drilling assembly; and
   (xi) combinations thereof.

2. The method of claim 1, wherein, subsequent to the characterizing, the method further includes continuing the drilling, wherein the continuing is based, at least in part, on the characterizing.

3. The method of claim 1, wherein the calculating and the characterizing are at least partially concurrent with the drilling and the measuring.

4. The method of claim 1, wherein the calculating the information entropy of the downhole parameter includes converting the downhole parameter to a binary parameter.

5. The method of claim 4, wherein the downhole parameter is $P(z_i)$, wherein the converting the downhole parameter to the binary parameter includes calculating $B(z_i)$, wherein $B(z_i)$ is the binary parameter, wherein $z_i$ is the distance, and further wherein:
   (i) $B(z_i)=1$ for $P(z_i) \geq$ a threshold downhole parameter value; and
   (ii) $B(z_i)=0$ for $P(z_i) <$ the threshold downhole parameter value.

6. The method of claim 5, wherein the calculating the information entropy of the downhole parameter further includes taking a derivative of the binary parameter with respect to distance to generate a distance-derivative of the binary parameter.

7. The method of claim 6, wherein the distance-derivative of the binary parameter is $B'(z_i)$, and further wherein:
   (i) $B'(z_i)=-1$ for $B(z_i)<B(z_{i-1})$;
   (ii) $B'(z_i)=0$ for $B(z_i)=B(z_{i-1})$; and
   (iii) $B'(z_i)=1$ for $B(z_i)>B(z_{i-1})$.

8. The method of claim 7, wherein the calculating the information entropy of the downhole parameter includes calculating a probability of nonzero $B'(z_i)$ within a moving window.

9. The method of claim 8, wherein the probability of nonzero $B'(z_i)$ is $p(B')$, wherein M is a number of distances $z_i$ included in the moving window, and further wherein $p(B')$ is calculated utilizing the equation:

$$p(B')|_{z_i} = \frac{1}{M}\sum_{i=1}^{M}|B'(z_i)|.$$

10. The method of claim 9, wherein E(B') is the information entropy, and further wherein the calculating the information entropy includes calculating the information entropy utilizing the equation:

$$E(B')|_{z_i} = -p(B')|_{z_i} \log(p(B')|_{z_i}).$$

11. The method of claim 5, wherein the downhole parameter is a shale volume, $V_{shale}$, as a function of distance, and further wherein the threshold downhole parameter value is a volume of shale cutoff, $VSH_{cutoff}$, for the shale volume.

12. The method of claim 11, wherein the characterizing includes at least one of:
(i) characterizing a given region within the subterranean formation as cloudy responsive to the information entropy being greater than a threshold information entropy value;
(ii) characterizing the given region within the subterranean formation as clean responsive to the information entropy being less than the threshold information entropy value;
(iii) characterizing the given region within the subterranean formation as clean shale responsive to the information entropy being less than the threshold information entropy value and $V_{shale}$ being greater than a threshold $V_{shale}$ value; and
(iv) characterizing the given region within the subterranean formation as clean sand responsive to the information entropy being less than the threshold information entropy value and $V_{shale}$ being less than the threshold $V_{shale}$ value.

13. The method of claim 1, wherein the characterizing includes at least one of:
(i) characterizing a given region within the subterranean formation as cloudy responsive to the information entropy being greater than a threshold information entropy value; and
(ii) characterizing the given region within the subterranean formation as clean responsive to the information entropy being less than the threshold information entropy value.

14. A method of drilling a wellbore within a subterranean formation, the method comprising:
drilling a first wellbore within the subterranean formation;
calculating an information entropy of a downhole parameter as a function of distance along the first wellbore that extends within the subterranean formation for a database of the downhole parameter as a function of distance along the first wellbore;
characterizing a spatial frequency of interface regions within the subterranean formation as a function of distance along the first wellbore based, at least in part, on the calculated information entropy of the downhole parameter; and
drilling another wellbore within the subterranean formation with a drilling assembly and regulating the drilling assembly while drilling the another wellbore based, at least in part, on the characterized spatial frequency of the interface regions within the subterranean formation that are proximal the drilling assembly, wherein the regulating includes at least one of:
(i) notifying an operator of a drill rig that is performing the drilling that the spatial frequency of the interface regions is greater than a threshold interface frequency;
(ii) decreasing a rotational frequency of the drilling assembly responsive to the spatial frequency of the interface regions being greater than the threshold interface frequency;
(iii) increasing the rotational frequency of the drilling assembly responsive to the spatial frequency of the interface regions being less than the threshold interface frequency;
(iv) increasing a flow rate of a drilling mud to the drilling assembly responsive to the spatial frequency of the interface regions being greater than the threshold interface frequency;
(v) decreasing the flow rate of the drilling mud to the drilling assembly responsive to the spatial frequency of the interface regions being less than the threshold interface frequency;
(vi) providing a lost circulation material to a drilling fluid that is utilized during the drilling the second wellbore, wherein the providing the lost circulation material is responsive to the spatial frequency of the interface regions being greater than the threshold interface frequency;
(vii) decreasing a weight on a bit of the drilling assembly responsive to the spatial frequency of the interface regions being greater than the threshold interface frequency;
(viii) increasing the weight on the bit of the drilling assembly responsive to the spatial frequency of the interface regions being less than the threshold interface frequency;
(ix) altering a density of the drilling fluid;
(x) altering an orientation of a drill bit on the drilling assembly; and
(xi) combinations thereof.

15. The method of claim 14, wherein the regulating is subsequent to the calculating and the characterizing and at least partially concurrent with the drilling.

16. The method of claim 14, wherein the calculating the information entropy of the downhole parameter includes converting the downhole parameter to a binary parameter.

17. The method of claim 16, wherein the downhole parameter is $P(z_i)$, wherein the converting the downhole parameter to the binary parameter includes calculating $B(z_i)$, wherein $B(z_i)$ is the binary parameter, wherein $z_i$ is the distance, and further wherein:
(i) $B(z_i)=1$ for $P(z_i) \geq$ a threshold downhole parameter value; and
(ii) $B(z_i)=0$ for $P(z_i)<$ the threshold downhole parameter value.

18. The method of claim 17, wherein the calculating the information entropy of the downhole parameter further includes taking a derivative of the binary parameter with respect to distance to generate a distance-derivative of the binary parameter.

19. The method of claim 18, wherein the distance-derivative of the binary parameter is $B'(z_i)$, and further wherein:
(i) $B'(z_i)=-1$ for $B(z_i)<B(z_{i-1})$;
(ii) $B'(z_i)=0$ for $B(z_i)=B(z_{i-1})$; and
(iii) $B'(z_i)=1$ for $B(z_i)>B(z_{i-1})$.

20. The method of claim 19, wherein the calculating the information entropy of the downhole parameter includes calculating a probability of nonzero $B'(z_i)$ within a moving window.

21. The method of claim 20, wherein the probability of nonzero $B'(z_i)$ is $p(B')$, wherein M is a number of distances $z_i$ included in the moving window, and further wherein $p(B')$ is calculated utilizing the equation:

$$p(B')|_{z_i} = \frac{1}{M}\sum_{i=1}^{M}|B'(z_i)|.$$

22. The method of claim 21, wherein E(B') is the information entropy, and further wherein the calculating the information entropy includes calculating the information entropy utilizing the equation:

$$E(B')|_{z_i} = -p(B')|_{t_i}\log(p(B')|_{z_i}).$$

23. The method of claim 17, wherein the downhole parameter is a shale volume, $V_{shale}$, as a function of distance, and further wherein the threshold downhole parameter value is a volume of shale cutoff, $VSH_{cutoff}$, for the shale volume.

24. The method of claim 23, wherein the characterizing includes at least one of:
   (i) characterizing a given region within the subterranean formation as cloudy responsive to the information entropy being greater than a threshold information entropy value;
   (ii) characterizing the given region within the subterranean formation as clean responsive to the information entropy being less than the threshold information entropy value;
   (iii) characterizing the given region within the subterranean formation as clean shale responsive to the information entropy being less than the threshold information entropy value and $V_{shale}$ being greater than a threshold $V_{shale}$ value; and
   (iv) characterizing the given region within the subterranean formation as clean sand responsive to the information entropy being less than the threshold information entropy value and $V_{shale}$ being less than the threshold $V_{shale}$ value.

25. The method of claim 14, wherein the characterizing includes at least one of:
   (i) characterizing a given region within the subterranean formation as cloudy responsive to the information entropy being greater than a threshold information entropy value; and
   (ii) characterizing the given region within the subterranean formation as clean responsive to the information entropy being less than the threshold information entropy value.

* * * * *